United States Patent
Banerjee

(10) Patent No.: US 9,985,834 B1
(45) Date of Patent: May 29, 2018

(54) METHODS AND SYSTEMS FOR AUTO-CONFIGURATION OF DIGITAL SUBSCRIBER LINE (DSL) MODEMS IN WIRELINE BROADBAND NETWORKS

(71) Applicant: Wipro Limited, Bangalore (IN)

(72) Inventor: Shyamtanu Banerjee, Pune (IN)

(73) Assignee: WIPRO LIMITED, Bangalore (IN)

( * ) Notice: Subject to any disclaimer, the term of this patent is extended or adjusted under 35 U.S.C. 154(b) by 0 days. days.

(21) Appl. No.: 15/408,775

(22) Filed: Jan. 18, 2017

(30) Foreign Application Priority Data

Nov. 30, 2016 (IN) .............................. 201641040998

(51) Int. Cl.
*H04L 12/24* (2006.01)
*H04B 1/3816* (2015.01)
(Continued)

(52) U.S. Cl.
CPC ....... *H04L 41/0886* (2013.01); *H04B 1/3816* (2013.01); *H04L 12/287* (2013.01); *H04L 41/0816* (2013.01); *H04L 67/141* (2013.01); *H04L 67/306* (2013.01); *H04L 67/34* (2013.01); *H04L 67/42* (2013.01); *H04W 8/24* (2013.01); *H04W 12/06* (2013.01)

(58) Field of Classification Search
CPC .............. H04L 41/0886; H04L 12/287; H04L 41/0816; H04L 67/42; H04L 67/306; H04L 67/141; H04L 67/34; H04W 12/06; H04W 8/24; H04B 1/3816
See application file for complete search history.

(56) References Cited

U.S. PATENT DOCUMENTS 7,280,820 B2  10/2007  Ekberg
8,417,216 B2  4/2013  Cofta
(Continued)

FOREIGN PATENT DOCUMENTS

WO  WO 2011/072429  6/2011
WO  WO 2015/069262  5/2015

OTHER PUBLICATIONS

Extended European Search Report issued in the European Patent Office in counterpart European Application No. 17161227.8, dated Sep. 27, 2017, 7 pages.

*Primary Examiner* — Kenneth Lam
(74) *Attorney, Agent, or Firm* — Finnegan, Henderson, Farabow, Garrett & Dunner, LLP

(57) ABSTRACT

A method and system for auto-configuration of a DSL modem in a wireline broadband network is disclosed. The method includes initiating, at a Subscriber Identification Module (SIM) card, a configuration request for configuring the DSL modem, wherein the SIM card is located within the DSL modem. After initiating, the configuration request is transferred from the SIM card to a configuration server over a mobile communication network. Thereafter, a configuration data corresponding to the configuration request is transferred to the SIM card over the mobile communication network from the configuration server, wherein the configuration data is determined based on at least one parameter associated with the configuration request. The SIM card receives the configuration data sent by the configuration server and automatically configures the DSL modem in response to receiving the configuration data from the configuration server.

17 Claims, 8 Drawing Sheets

(51) Int. Cl.
*H04W 8/24* (2009.01)
*H04L 29/08* (2006.01)
*H04L 29/06* (2006.01)
*H04W 12/06* (2009.01)
*H04L 12/28* (2006.01)

(56) References Cited

U.S. PATENT DOCUMENTS

| | | | |
|---|---|---|---|
| 8,417,218 B2 * | 4/2013 | Cofta | H04W 12/06 380/247 |
| 9,432,363 B2 | 8/2016 | Abdulrahiman et al. | |
| 2007/0022469 A1 * | 1/2007 | Cooper | H04K 1/00 726/3 |
| 2009/0225736 A1 | 9/2009 | Patarkazishvili | |
| 2012/0282900 A1 * | 11/2012 | Zhang | H04L 41/0856 455/411 |
| 2015/0295728 A1 | 10/2015 | Kadel et al. | |
| 2016/0285676 A1 * | 9/2016 | Kerpez | H04M 3/304 |

\* cited by examiner

METHODS AND SYSTEMS FOR AUTO-CONFIGURATION OF DIGITAL SUBSCRIBER LINE (DSL) MODEMS IN WIRELINE BROADBAND NETWORKS

TECHNICAL FIELD

The present invention relates to wireline broadband network, in particular, to methods and systems for auto-configuration of Digital Subscriber Line (DSL) modem in wireline broadband networks.

BACKGROUND

The use of Digital Subscriber Line (DSL) technology has increased in recent years, allowing high-speed (i.e., broadband) access from a central location, typically a telephone central office, to multiple subscribers in homes or offices located at remote sites. One of the major problems associated with adoption of DSL technology is the cost and complexity of initial setup of a DSL modem at a remote location. In most of the cases, the setup (configuration) cannot be done without a visit to the remote location by an engineer/technician from the service provider. This leads to increased cost and complexity in configuration of the DSL modem as well as increased dependence on the availability of the engineer/technician for seamless and faster configuration of the DSL modem.

In the event where a customer has changed the service provider, the customer is often required to buy a new DSL modem as the older DSL modem is not compatible with the new service provider. Even in those cases where a new DSL modem is not required to be bought, the configuration process is tedious and complicated and cannot be done by the consumer alone without any help from the engineer or the technician. As a result, the customer is left dependent on the availability of the engineer to come to the customer's site and configure the DSL modem. Even in those circumstances where the customer is with the same service provider when he relocates to a new location, the configuration still needs to be done again which lead to service outage and increased installation costs.

Moreover, DSL modem and other customer premise equipment are managed via wireline, wherein one Virtual LAN (VLAN) port is reserved permanently for device management. Reserving a VLAN port only for Authentication, Authorization, and Accounting (AAA) and device management is a potential revenue loss to the service providers as the reserved VLAN resources cannot be used for any other purpose and do not operate at their optimal level as they are not fully utilized at all time. Further, a large amount of time is required to locate and re-configure the DSL modem and other customer equipments when there is damage on wireline or in the event of a broken wireline leading to overall bad customer experience.

Thus, there is a need for an efficient method and system for auto-configuration of a DSL modem in a wireline broadband network which reduces the complexity of configuration process, reduces the overall costs and increases the overall customer experience.

SUMMARY

In one embodiment, a method for auto-configuration of a Digital Subscriber Line (DSL) modem in a wireline broadband network is disclosed. The method includes initiating, at a Subscriber Identification Module (SIM) card, a configuration request for configuring the DSL modem, wherein the SIM card is located within the DSL modem; transferring, from the SIM card, the configuration request to a configuration server over a mobile communication network; sending, from the configuration server, a configuration data corresponding to the configuration request to the SIM card over the mobile communication network, wherein the configuration data is determined based on at least one parameter associated with the configuration request; receiving, at the SIM card, the configuration data sent by the configuration server; and automatically configuring, by the SIM card, the DSL modem in response to receiving the configuration data from the configuration server.

In another embodiment a system auto-configuration of a Digital Subscriber Line (DSL) modem in a wireline broadband network is disclosed. The system includes a Subscriber Identification Module (SIM) card, operatively coupled with the DSL modem and located within the DSL modem; a configuration server, communicatively connected with the SIM card; and a Broadband Remote Access Server (BRAS), communicatively connected with the configuration server and the SIM card, wherein the SIM card is configured to initiate a configuration request for configuring the DSL modem; transfer the configuration request to the configuration server over a mobile communication network; receive a configuration data corresponding to the configuration request from the configuration server, wherein the configuration data is determined based on at least one parameter associated with the configuration request; and automatically configure the DSL modem in response to receiving the configuration data from the configuration server.

In yet another embodiment, a computer-usable medium is disclosed, the computer-usable medium having non-transitory computer readable instructions stored thereon for execution by a processor in wireline broadband network to perform a method for initiating a configuration request at a SIM card for configuring a Digital Subscriber Line (DSL) modem; transferring the configuration request to a configuration server over a mobile communication network; sending a configuration data corresponding to the configuration request to the SIM card over the mobile communication network, wherein the configuration data is determined based on at least one parameter associated with the configuration request; receiving the configuration data sent by the configuration server; and automatically configuring the DSL modem in response to receiving the configuration data from the configuration server.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Various embodiments of the invention provide methods, systems, and computer program products for auto-configuration of a DSL modem in a wireline broadband network. The method includes initiating, at a Subscriber Identification Module (SIM) card, a configuration request for configuring the DSL modem, wherein the SIM card is located within the DSL modem. After initiating, the configuration request is transferred from the SIM card to a configuration server over a mobile communication network. Thereafter, a configuration data corresponding to the configuration request is transferred to the SIM card over the mobile communication network from the configuration server, wherein the configuration data is determined based on at least one parameter associated with the configuration request. The SIM card receives the configuration data sent by the configuration server and automatically configures the DSL modem in response to receiving the configuration data from the configuration server.

Figure 1:
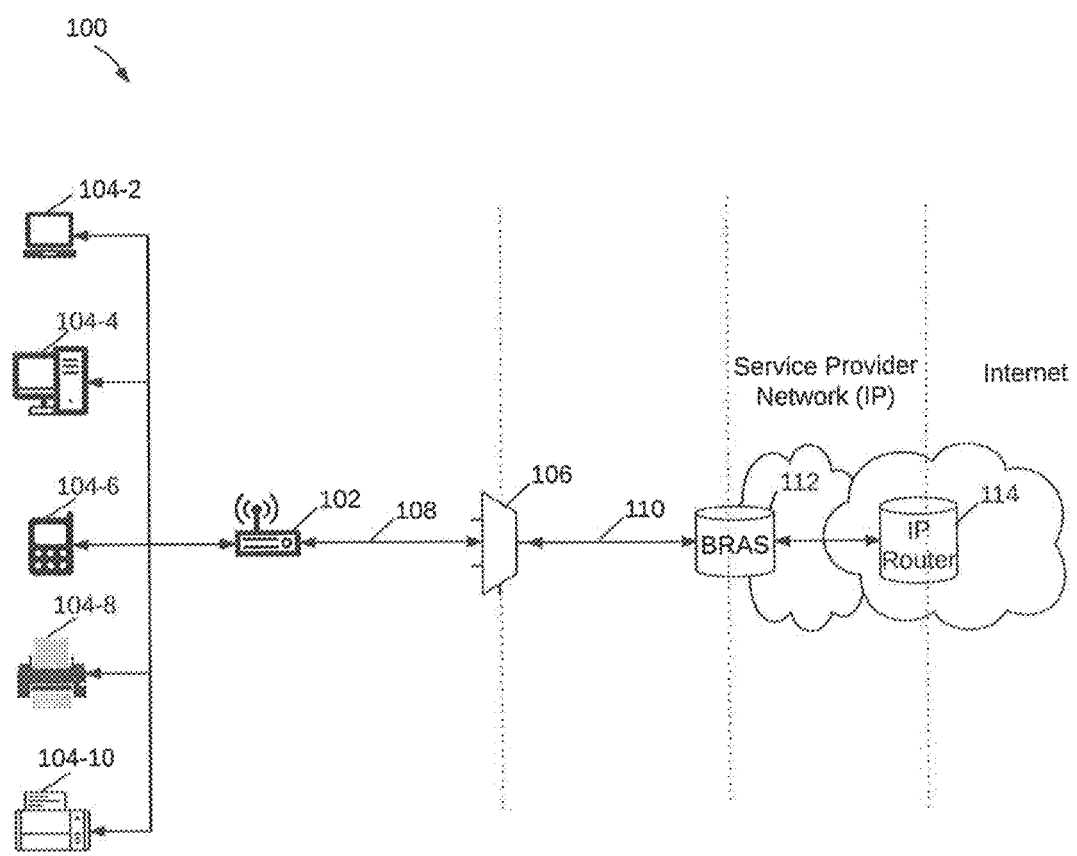
FIG. 1 is a system diagram of a wireline broadband network (that is exemplary) in which embodiments of the present inventive concepts may be employed.

FIG. 1 is a system diagram of a wireline broadband network 100 in which embodiments of the present inventive concepts may be employed. Wireline broadband network 100 includes a DSL modem 102 which is connected to a plurality of customer premise equipments 104-n ('n' represents the number of customer premise equipments). Examples of the customer premise equipments 104-n include, but are not limited to a laptop 104-2, a desktop computer 104-4, a telephone 104-6, a printer 104-8, and a fax machine 104-10. Each equipment of the plurality of customer premise equipment 104-n is operatively coupled with DSL modem 102 for exchanging data. DSL modem 102 is further connected to a Digital Subscriber Line Access Multiplexer (DSLAM) 106 using DSL line 108. DSL line 108 typically corresponds to one of a High-data-rate DSL (HDSL) line, a Very high DSL (VDSL) line, a Symmetric DSL (SDSL) line, and an Asymmetric DSL (ADSL) line. DSLAM 106 is a network device that receives signals from multiple customers DSL modem over the DSL lines and puts the signals on a high speed backbone line 110 using multi-plexing techniques. Example of high speed backbone line 110 includes, but is not limited to Ethernet, and Asynchronous Transfer Mode (ATM).

DSLAM 106 uses the high speed backbone line 110 to connect to a Broadband Remote Access Server (BRAS) 112. BRAS 112 is used for routing data traffic to and from various DSLAM devices present in wireline broadband network 100 and typically sits at the edge of an Internet Service Provider's (ISP) core network as shown in FIG. 1. BRAS 112 also acts as the interface for authentication, authorization and accounting systems in wireline broadband network 100. By acting as a network termination point, BRAS 112 is also responsible for assigning network parameters such as IP addresses to plurality of customer premise equipments 104-n. Further, as shown in FIG. 1, BRAS 112 is connected to an Internet Router 114 and acts as the first IP hop from the customer to the Internet. DSL modem 102 needs to be configured correctly so that data traffic from Internet can be sent and received from plurality of Customer Premise Equipments 104-n in a seamless manner. Configuration of DSL modem 102 is typically done by an engineer or a technician belonging to the Internet Service Provider by visiting the customer premise and manually configuring DSL modem 102.

Figure 2:
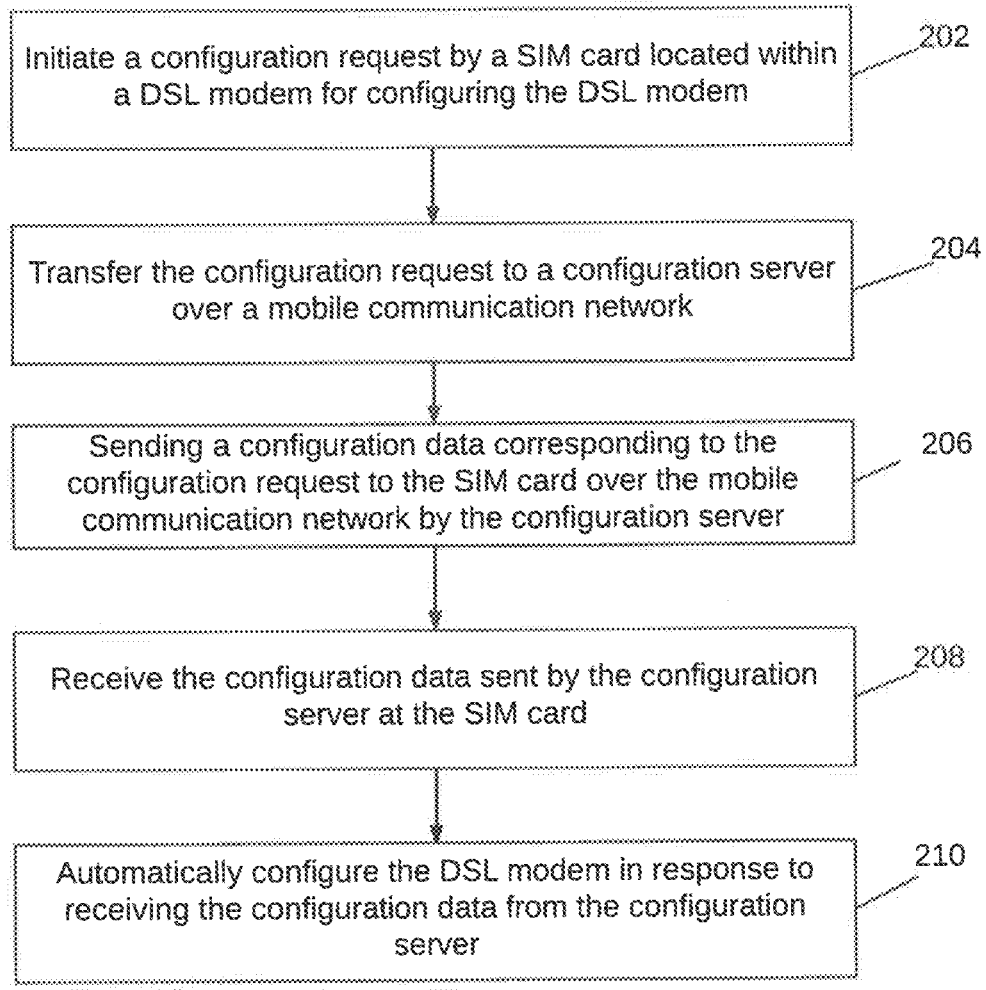
FIG. 2 illustrates a flowchart of a method for auto-configuration of a DSL modem, in accordance with an embodiment.

FIG. 2 illustrates a flowchart of a method for auto-configuration of a DSL modem in wireline broadband network 100, in accordance with an embodiment. As has already been explained in conjunction with FIG. 1, a DSL modem needs to be configured in order for it to send and receive data traffic and connect the plurality of customer premise equipment to the Internet. In order to automatically configure the DSL modem, at step 202, a configuration request is initiated. The configuration request is initiated for configuring the DSL modem by a Subscriber Identifier Module (SIM) card located within the DSL modem. The configuration request may be initiated by the SIM card using either software loaded in the SIM card or by a firmware associated with the SIM card or the DSL modem. The configuration request may be initiated either after a power up of the DSL modem or at a specified interval. Further, the configuration request may be initiated either automatically or manually by the consumer associated with the DSL modem. The various situations based on which the configuration request is initiated at the SIM card is further explained in detail in conjunction with FIG. 3.

After initiating the configuration request, at step 204, the configuration request is transferred by the SIM card to a configuration server. The configuration request is transferred by the SIM card to the configuration server over a mobile communication network. Examples of the mobile communication network includes, but are not limited to Wireless, Wi-Fi, WiMax, Cellular, Radio, Long-Term-Evolution (LTE), CDMA, and GSM. The SIM card is pre-configured to transfer data over the mobile communication network. It will be evident to a person skilled in the art that any other form of wireless communication may be utilized to transfer the configuration request from the SIM card to the configuration server. The configuration server may correspond to a Home Device Management Server (HDMS) situated near mobile backhaul in the mobile communication network.

Thereafter, at step 206, a configuration data corresponding to the configuration request sent by the SIM card is sent by the configuration server to the SIM card. The configuration data is determined and generated based on one or more parameters associated with the configuration request initiated by the SIM card for the DSL modem. Examples of the one or more parameters include device type, device computing capabilities, device firmware version, device hardware, device manufacturer, and device software. Based on the one or more parameters, the configuration data is accordingly determined and generated at the configuration server so that the correct configuration data is sent to the SIM card located within the DSL modem. Further details of the one or more parameters based on which the configuration data is determined and generated is further explained in detail in conjunction with FIG. 3.

At step 208, the configuration data is received by the SIM card at the DSL modem. The configuration data may correspond to one or more of an IP address information, DNS Information, remote diagnosis information, authentication information, firmware management Information, and device management information associated with the DSL modem. The received configuration data may be stored either locally within the SIM card memory or in a separate storage space located within the DSL modem. After receiving the configuration data, at step 210, the DSL modem is automatically configured. The DSL modem is configured by the SIM card based on the configuration data that is received. Alternatively, in an embodiment, the auto-configuration may be performed by a processor located within the DSL modem based on the configuration data received by the SIM card from the configuration server. Configuration of the DSL modem is performed automatically without requiring any intervention from the consumer or an engineer/technician.

Figure 3:
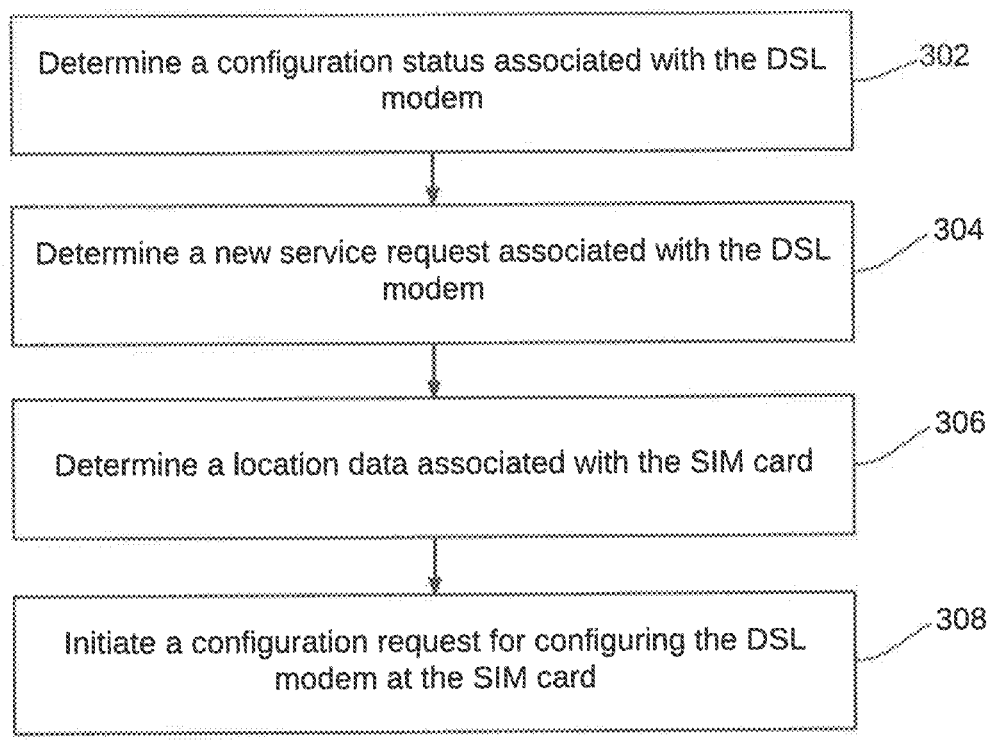
FIG. 3 illustrates a flowchart of a method for initiating a configuration request for a DSL modem, in accordance with an embodiment.

FIG. 3 illustrates a flowchart of a method for initiating a configuration request for the DSL modem, in accordance with an embodiment. As has already been explained in conjunction with FIG. 2, the DSL modem needs to be configured for it to send and receive data traffic from the Internet. After connecting the DSL modem in wireline broadband network 100 at the customer premise, initially the DSL modem is powered on. After powering up the DSL modem, at step 302, a configuration status associated with the DSL modem is determined. The configuration status associated with the DSL modem specifies whether the DSL modem is a new modem which hasn't been configured yet or whether the DSL modem is a used modem which has been configured before for a DSL service provider. If the DSL modem is a new modem, then one or more parameters associated with the DSL modem is determined. The one or more parameters may correspond to DSL modem type, DSL modem computing capabilities, DSL modem firmware version, DSL modem hardware, and DSL modem manufacturer. Alternatively, if the DSL modem is a used modem, then additional parameters such as DSL modem software, DSL modem last update version number, and DSL modem last update date may also be determined.

Depending on the determination of the configuration status, at step 304, a new service request associated with the DSL modem may be determined. The new service request may correspond to a new billing plan, a new value added service, and a top-up request. It will be evident to a person skilled in the art that the service request will depend on the offerings of the DSL service provider or the Internet Service Provider. New capabilities and new services keep getting added and offered by the Internet Service Providers to the customers. The customer may choose to request for a new service offered by the Internet Service Provider and details of the service requested may get reflected at the DSL modem.

Thereafter, based on the outcome of determination of the new request, at step 306, a location data associated with the SIM card located within the DSL modem is determined. The location data is determined to identify whether the customer has moved to a new location or premise. The location data associated with the SIM card may be determined using GPS technology. Alternatively, any other available technologies may be utilized to determine the location of the SIM card. Finally, at step 308, a configuration request for configuring the DSL modem is initiated by the SIM card. The configuration request is initiated by the SIM card based on the outcome of the determination of configuration status associated with the DSL modem, determination of the new service request associated with the DSL modem, and determination of the location data associated with the SIM card. Thus, the configuration request is initiated dynamically and in an ad-hoc manner based on the outcome of one or more parameters associated with the DSL modem and the SIM card.

Figure 4:
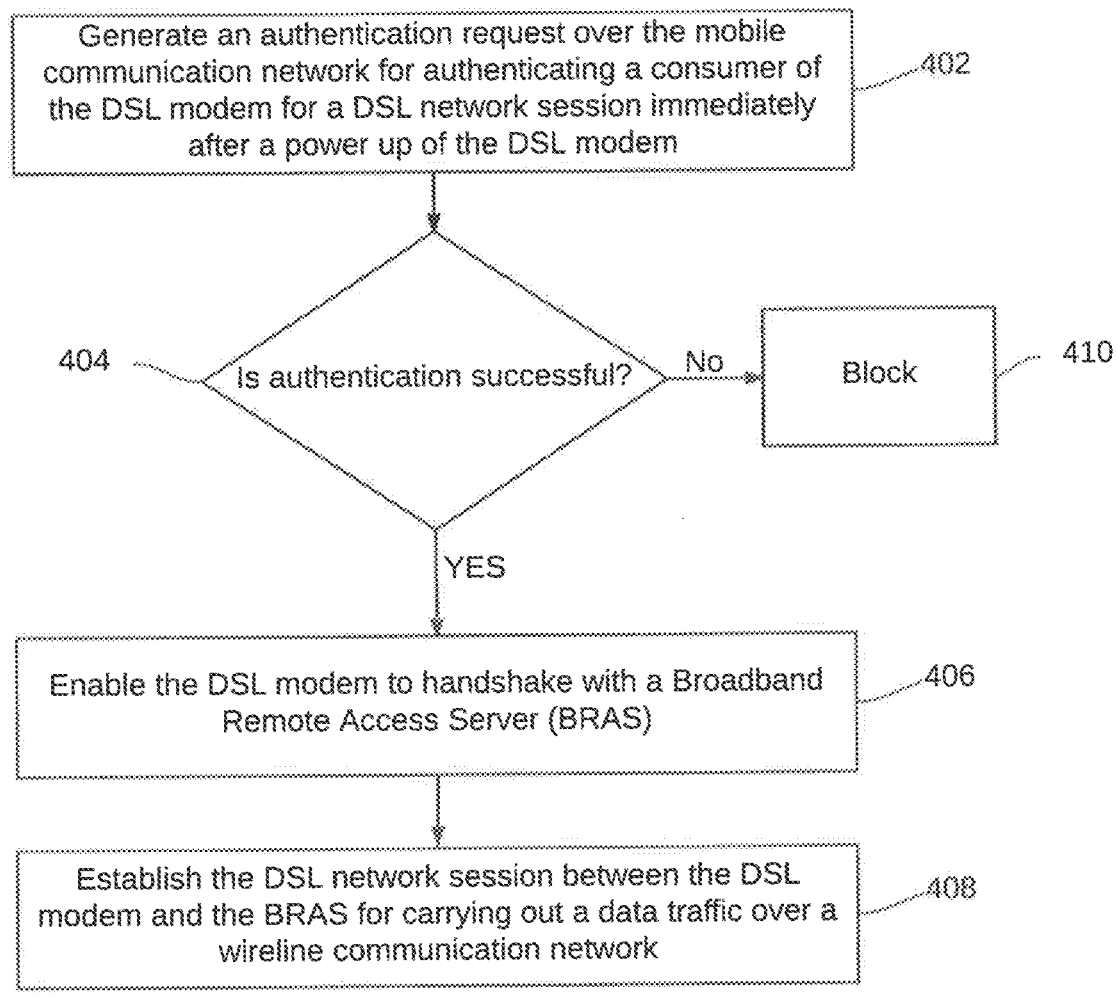
FIG. 4 illustrates a flowchart of a method for establishing a DSL network session between a DSL modem and a Broadband Remote Access Server (BRAS), in accordance with an embodiment.

FIG. 4 illustrates a flowchart of a method for establishing a DSL network session between a DSL modem and a Broadband Remote Access Server (BRAS), in accordance with an embodiment. Once the DSL modem has been automatically configured based on the configuration data sent by the configuration server, the DSL modem enters an operative state. In order for the DSL modem to send and receive data traffic in wireline broadband network 100, certain specific information needs to be verified. Thus, at step 402, an authentication request is generated by the SIM card located within the DSL modem. The authentication request is sent to a mobile backhaul, wherein the mobile backhaul is operatively coupled with the configuration server and the DSL modem. The authentication request is sent to the mobile backhaul using the mobile communication network that connects the DSL modem to the configuration server. The authentication request is generated for authenticating the customer of the DSL modem for a DSL network session immediately after the power up of the DSL modem.

Thereafter, at step 404, outcome of the authentication request is determined. If the authentication is successful, then at step 406, a handshake between the DSL modem and a Broadband Remote Access Server (BRAS) is enabled. The BRAS has already been explained in detail in conjunction with FIG. 1. The handshake is enabled on the wireline communication network that connects the DSL modem to the BRAS. Examples of the wireline communication network include, but are not limited to ATM, and Ethernet. If the handshake is successful, then at step 408, a DSL network session between the DSL modem and the BRAS is established. The DSL network session allows data traffic transfer between the DSL modem and the BRAS and subsequently data traffic transfer between the DSL modem and the Internet. In the event that authentication is unsuccessful at step 404, then at step 410, the SIM card is blocked and no handshake is allowed between the DSL modem and the BRAS. Depending on the number of failed authentication attempts, the SIM card may be either temporarily blocked or permanently blocked.

Figure 5:
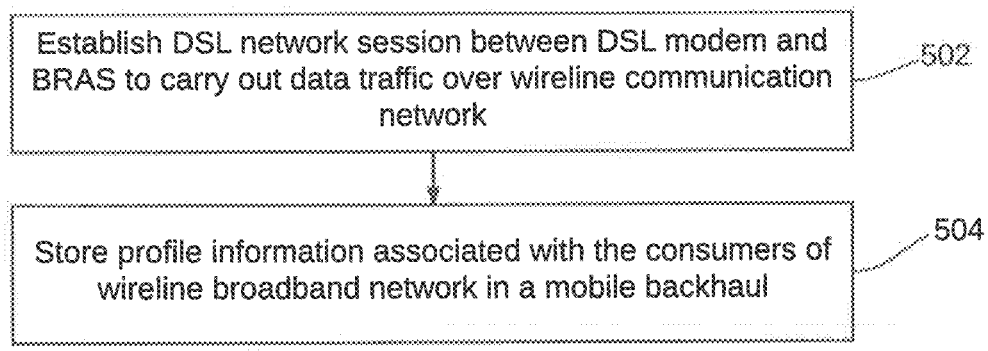
FIG. 5 illustrates a flowchart of a method for storing profile information associated with users of a wireline broadband network, in accordance with an embodiment.

FIG. 5 illustrates a flowchart of a method for storing profile information associated with users of a wireline broadband network, in accordance with an embodiment. At step 502, a DSL network session between the DSL modem and the BRAS is established. Once the DSL network session is established, data traffic transfer is enabled between the DSL modem and the Internet over the wireline communication network. This has already been explained in conjunction with FIG. 4. Thereafter, at step 504, profile information associated with the customer of the DSL modem is stored in the mobile backhaul. The mobile backhaul has already been explained in detail in conjunction with FIG. 4.

In an embodiment, the profile information may be stored either at a Home Location Register (HLR) or at a Home Subscriber Server (HSS) situated in the mobile backhaul. It will be evident to a person skilled in the art that the profile information may be alternatively stored at any other place associated with the mobile backhaul. The profile information associated with the customer of DSL modem may include information such as authentication Information associated with the customer, subscription plan associated with the customer, billing details associated with the customer, and customer preferences. The profile information stored in HSS or HLR is also used for authenticating the customer of the DSL modem at power up of the DSL modem for establishing a DSL network session. This has already been explained in detail in conjunction with FIG. 4.

Figure 6:
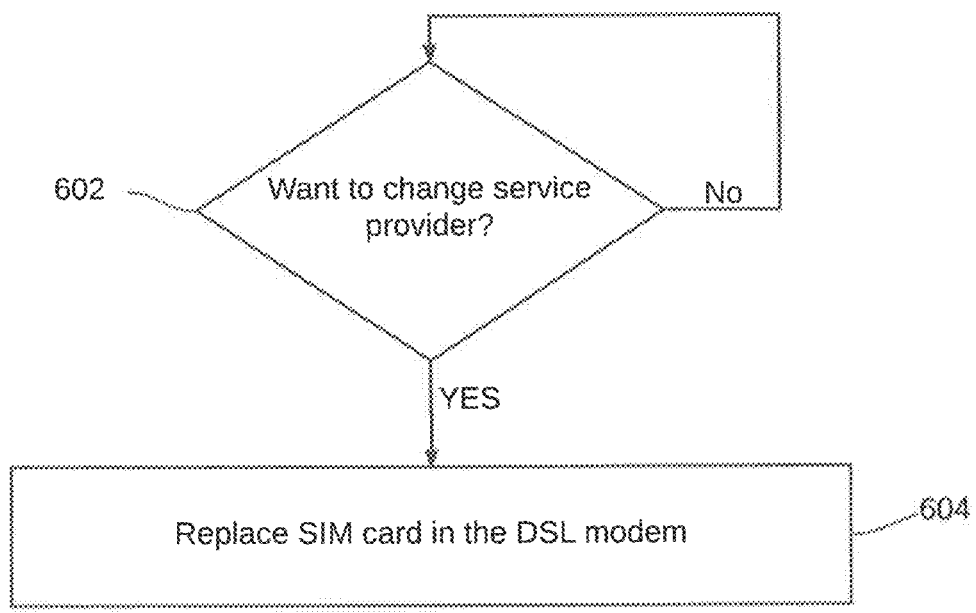
FIG. 6 illustrates a flowchart of a method for changing a service provider in a wireline broadband network, in accordance with an embodiment.

FIG. 6 illustrates a flowchart of a method for changing a service provider in a wireline broadband network, in accordance with an embodiment. Once the DSL network session has been established between the DSL modem and the BRAS, data traffic transfer between the DSL modem and the Internet is enabled. In the event where the customer is not happy or satisfied with an Internet Service Provider, the customer can choose to change to a different Internet Service Provider. Thus, at step 602, it is determined whether the customer wishes to change the existing Internet Service Provider. If the customer wishes to change the service provider, then at step 604, the SIM card associated with the DSL modem is replaced with a new SIM card. The new SIM card may be associated with the new Internet Service Provider that the customer has chosen. If the customer does not wish to change the existing Internet Service Provider, then at step 606, the established DSL network session between the DSL modem and the existing Internet Service Provider is allowed to continue.

Figure 7:
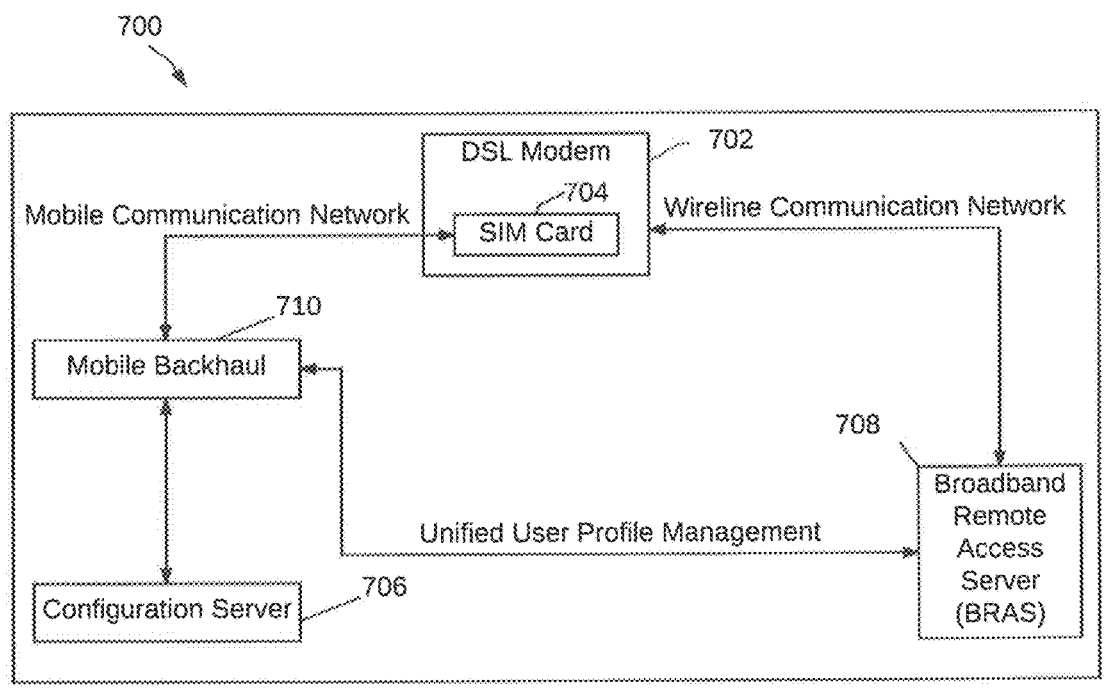
FIG. 7 illustrates a system for auto-configuration of a DSL modem in a wireline broadband network, in accordance with an embodiment.

FIG. 7 illustrates a system 700 for auto-configuration of a DSL modem in a wireline broadband network, in accordance with an embodiment. System 700 includes a DSL modem 702, a SIM card 704 located within DSL modem 702, a Configuration Server 706, a BRAS 708, and a Mobile Backhaul 710. Each component in system 700 is operatively coupled with each other as is shown in FIG. 7. DSL modem 702 is situated within a customer's premise and is further connected to a plurality of Customer Premise Equipments (CPEs) (not shown in FIG. 7). Examples of the plurality of CPEs include, but are not limited to a laptop, a desktop computer, a printer, a telephone, and a fax machine. DSL modem 702 is connected with Configuration Server 706 and Mobile Backhaul 710 through a mobile communication network as is shown in FIG. 7. Examples of the mobile communication network include, but are not limited to wireless, Wi-Fi, WiMax, Cellular, Radio, Long-Term-Evolution (LTE), CDMA, and GSM. On the other hand, DSL modem 702 is connected with BRAS 708 through a wireline communication network. Examples of the wireline communication network include, but are not limited to an ATM, and an Ethernet.

In order for CPEs to send and receive data traffic from the Internet over the wireline communication network, DSL modem 702 must be configured based on the requirements specified by the Internet Service Provider. For automatically configuring DSL modem 702, SIM card 704 located within DSL modem 702 initiates a configuration request. The configuration request may be initiated by SIM card 704 using either software loaded in SIM card 704 or by a firmware associated with SIM card 704 or firmware associated with DSL modem 702. The configuration request may be initiated either after a power up of DSL modem 702 or at a specified interval. Further, the configuration request may be initiated either automatically or manually by the consumer associated with DSL modem 702. Thus, once DSL modem 702 is powered on, SIM card 704 determines a configuration status associated with DSL modem 702. The configuration status associated with DSL modem 702 specifies whether DSL modem 702 is a new modem which hasn't been configured yet or whether DSL modem 702 is a used modem which has been configured before for a DSL service provider. If DSL modem 702 is a new modem, then one or more parameters associated with DSL modem 702 is determined. The one or more parameters may correspond to DSL modem type, DSL modem computing capabilities, DSL modem firmware version, DSL modem hardware, and DSL modem manufacturer. Alternatively, if DSL modem 702 is a used modem, then additional parameters such as DSL modem software, DSL modem last update version number, and DSL modem last update date may also be determined.

Based on the outcome of the determination of configuration status, SIM card 704 may determine whether a new service request associated with DSL modem 702 is currently pending. The new service request may correspond to a new billing plan, a new value added service, and a top-up request. It will be evident to a person skilled in the art that the service request will depend on the offerings of the DSL service provider or the Internet Service Provider. New capabilities and new services keep getting added and offered by the Internet Service Providers to the customers. The customer may choose to request for a new service offered by the Internet Service Provider and details of the service requested may get reflected at DSL modem 702.

Based on the outcome of determination of the new request. SIM card 704 may determine a location data associated with SIM card 704. The location data is determined to identify whether the customer has moved to a new location or premise. The location data associated with SIM card 704 may be determined using GPS technology. Alternatively, any other available technologies may be utilized to determine the location of SIM card 704.

Depending on the outcome of the configuration status, new request, and the location data, SIM card 704 initiates a configuration request for configuring DSL modem 702. Thereafter, the configuration request is transferred by SIM card 704 to configuration server 706. The configuration request is transferred by SIM card 704 to configuration server 706 over the mobile communication network. In an embodiment, configuration server 706 may correspond to a Home Device Management Server (HDMS) situated near mobile backhaul 710 in the mobile communication network.

In response to receiving the configuration request from SIM card 704, a configuration data is sent by configuration server 706 to SIM card 704. The configuration data is determined and generated based on one or more parameters associated with the configuration request initiated by SIM card 704 for DSL modem 702. Examples of the one or more parameters include device type, device computing capabilities, device firmware version, device hardware, device manufacturer, and device software. Based on the one or more parameters, the configuration data is accordingly determined and generated at configuration server 706 so that the correct configuration data is sent to SIM card 704.

Thereafter, SIM card 704 receives the configuration data sent by configuration server 706. The configuration data may correspond to one or more of an IP address information, DNS information, remote diagnosis information, authentication Information, firmware management information, and device management information associated with DSL modem 702. The received configuration data may be stored either locally within memory associated with SIM card 704 or in a separate storage space located within DSL modem 702.

Based on the received configuration data, SIM card 704 automatically configures DSL modem 702. Alternatively, in an embodiment, the auto-configuration may be performed by a processor located within DSL modem 702 based on the configuration data received by SIM card 704 from configuration server 706. Configuration of DSL modem 702 is performed automatically without requiring any intervention from the consumer or an engineer/technician belonging to the Internet Service Provider.

After automatically configuring DSL modem 702, an authentication request is generated by SIM card 704. The authentication request is sent to mobile backhaul 710 using the mobile communication network. The authentication request is generated for authenticating the customer of DSL modem 702 for a DSL network session immediately after the power up of the DSL modem 702. If the authentication is successful, then a handshake between DSL modem 702 and BRAS 708 is enabled on the wireline communication network. If the handshake is successful, then a DSL network session is established between DSL modem 702 and BRAS 708. The DSL network session allows data traffic transfer between DSL modem 702 and BRAS 708 and subsequently data traffic transfer between DSL modem 702 and the Internet over the wireline communication network. In the event that authentication is unsuccessful, then SIM card 704 is blocked and no handshake is allowed between DSL modem 702 and BRAS 708. Depending on the number of failed authentication attempts, SIM card 704 may be either temporarily blocked or permanently blocked.

After the DSL network session has been established, profile information associated with the customer of DSL modem 702 is stored in mobile backhaul 710 for facilitating unified user profile management. The profile information may be stored either at a Home Location Register (HLR) or at a Home Subscriber Server (HSS) situated in mobile backhaul 710 (not shown in FIG. 7). The profile information associated with the customer of DSL modem 702 may include information such as authentication information associated with the customer, subscription plan associated with the customer, billing details associated with the customer, and customer preferences. The profile information stored in HSS or HLR is also used for authenticating the customer of DSL modem 702 at power up of DSL modem 702 for establishing the DSL network session.

In the event where the customer is not happy or satisfied with an Internet Service Provider, the customer can choose to change to a different Internet Service Provider. If the customer wishes to change the service provider, then SIM card 704 associated with DSL modem 702 is replaced with a new SIM card. The new SIM card may be associated with the new Internet Service Provider that the customer has chosen. If the customer does not wish to change the existing Internet Service Provider, then the established DSL network session between DSL modem 702 and the existing Internet Service Provider is allowed to continue.

Figure 8:
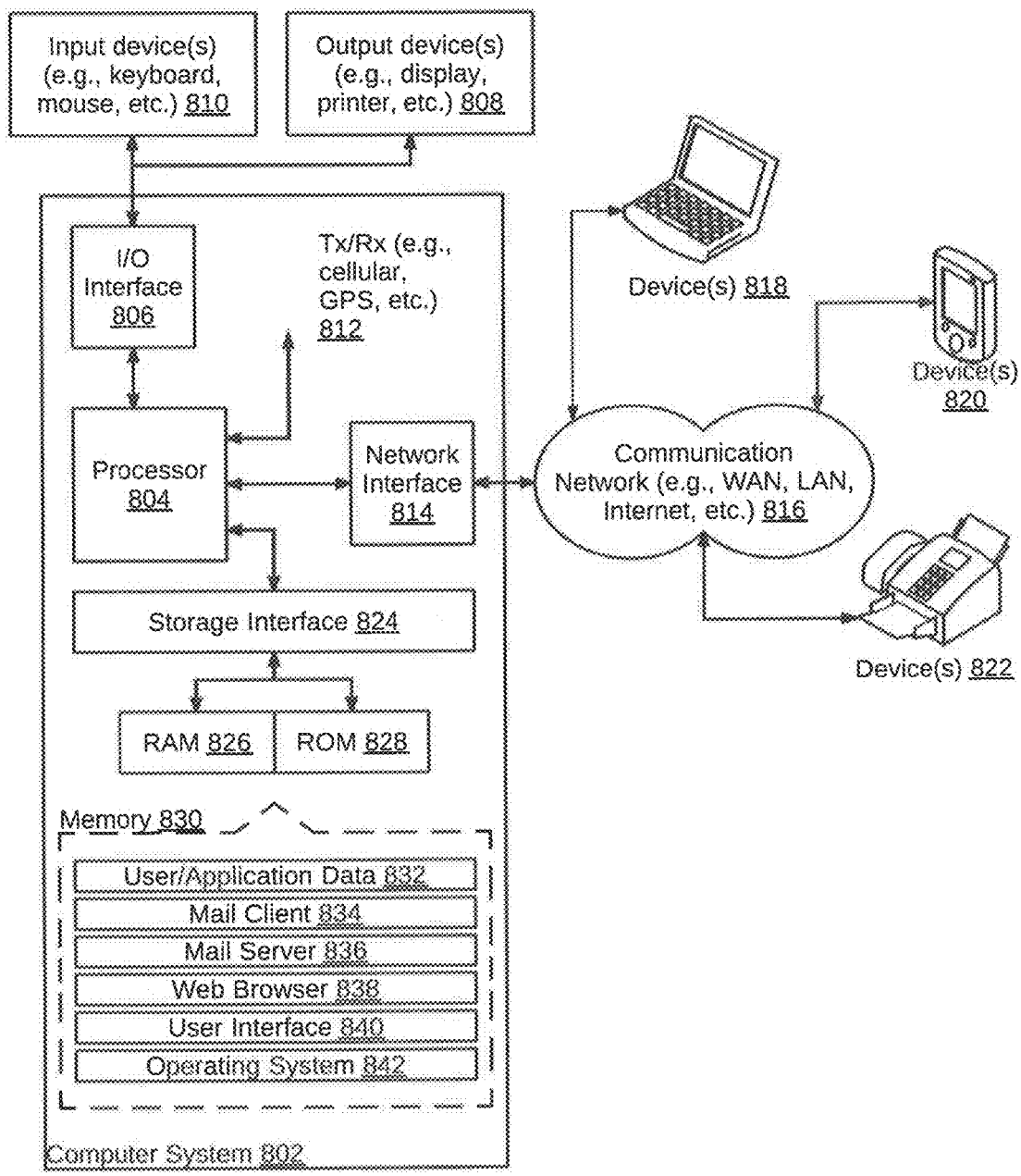
FIG. 8 illustrates a block diagram of an exemplary computer system for implementing various embodiments.

FIG. 8 illustrates a block diagram of an exemplary computer system 802 for implementing various embodiments is disclosed. Computer system 802 may comprise a central processing unit ("CPU" or "processor") 804. Processor 804 may comprise at least one data processor for executing program components for executing user- or system-generated requests. A user may include a person, a person using a device such as such as those included in this disclosure, or such a device itself. Processor 804 may include specialized processing units such as integrated system (bus) controllers, memory management control units, floating point units, graphics processing units, digital signal processing units, etc. Processor 804 may include a microprocessor, such as AMD Athlon, Duron or Opteron, ARM's application, embedded or secure processors, IBM PowerPC, Intel's Core, Itanium, Xeon, Celeron or other line of processors, etc. Processor 804 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 804 may be disposed in communication with one or more input/output (I/O) devices via an I/O interface 806. I/O interface 806 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 806, computer system 802 may communicate with one or more I/O devices. For example, an input device 808 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 810 may be a printer, fax machine, video display (e.g., cathode ray tube (CRT), liquid crystal display (LCD), light-emitting diode (LED), plasma, or the like), audio speaker, etc. In some embodiments, a transceiver 812 may be disposed in connection with processor 804. Transceiver 812 may facilitate various types of wireless transmission or reception. For example, transceiver 812 may include an antenna operatively connected to a transceiver chip (e.g., Texas Instruments WiLink WL1283, Broadcom BCM4760IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 804 may be disposed in communication with a communication network 814 via a network interface 816. Network interface 816 may communicate with communication network 814. Network interface 816 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 814 may include, without limitation, a direct interconnection, local area network (LAN), wide area network (WAN), wireless network (e.g., using Wireless Application Protocol), the Internet, etc. Using network interface 816 and communication network 814, computer system 802 may communicate with devices 818, 820, and 822. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 602 may itself embody one or more of these devices.

In some embodiments, processor 804 may be disposed in communication with one or more memory devices (e.g., a RAM 826, a ROM 828, etc.) via a storage interface 824. Storage interface 824 may connect to memory devices 830 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 830 may store a collection of program or database components, including, without limitation, an operating system 832, a user interface application 834, a web browser 836, a mail server 838, a mail client 840, a user/application data 842 (e.g., any data variables or data records discussed in this disclosure), etc. Operating system 832 may facilitate resource management and operation of computer system 802. Examples of operating system 832 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 834 may facilitate display, execution, interaction, manipulation, or operation of program components through textual or graphical facilities. For example, user interfaces may provide computer interaction interface elements on a display system operatively connected to computer system 802, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 802 may implement web browser 836 stored program component. Web browser 836 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 802 may implement mail server 838 stored program component. Mail server 838 may be an Internet mail server such as Microsoft Exchange, or the like. Mail server 838 may utilize facilities such as ASP, ActiveX, ANSI C++/C#, Microsoft .NET, CGI scripts, Java, JavaScript, PERL, PHP, Python, WebObjects, etc. Mail server 838 may utilize communication protocols such as internet message access protocol (IMAP), messaging application programming interface (MAPI), Microsoft Exchange, post office protocol (POP), simple mail transfer protocol (SMTP), or the like. In some embodiments, computer system 802 may implement mail client 840 stored program component. Mail client 840 may be a mail viewing application, such as Apple Mail, Microsoft Entourage, Microsoft Outlook, Mozilla Thunderbird, etc.

In some embodiments, computer system 802 may store user/application data 842, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide methods, system, and computer program products for auto-configuration of a DSL modem in a wireline broadband network. The use of mobile network communication and SIM card for auto-configuration of DSL modem reduce the configuration costs and makes the overall configuration process simple and seamless. The dependency on an engineer or a technician belonging to an Internet Service Provider for configuration of the DSL modem is removed because of auto-configuration of the DSL modem using the SIM card that obtains the configuration data using the mobile communication network. The method also eliminates the use of VLAN port for configuring the DSL modem and thereby makes available the VLAN resources for other purposes. Further, re-configuration of DSL modem whenever the customer relocates is facilitated as a result of determination of location data of the customer based on the SIM card and auto-configuration of DSL modem based on the new location data which has been identified. Additionally, customers do not have to buy a new modem every time they relocate. Further, Data traffic flow through the wireline communication network but device management and user configurations happen through the air interface on mobile communication network thereby making the overall system faster and optimal at the same time. The method also allows for remote diagnosis of DSL modem without requiring the presence of an engineer or a technician at the customer's premise. Authentication of SIM card also makes the system secure and ensures that unsolicited devices cannot access the wireline broadband network.

The specification has described systems and methods for auto-configuration of DSL modem in a wireline broadband network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for auto-configuration of a Digital Subscriber Line (DSL) modem in a wireline broadband network, the method comprising:
   initiating, at a Subscriber Identification Module (SIM) card, a configuration request for configuring the DSL modem, wherein the SIM card is located within the DSL modem, the configuration request being based on a location data associated with the SIM card;
   transferring, from the SIM card, the configuration request to a configuration server over a mobile communication network;
   sending, from the configuration server, a configuration data corresponding to the configuration request to the SIM card over the mobile communication network, wherein the configuration data is determined based on at least one parameter associated with the configuration request;
   receiving, at the SIM card, the configuration data sent by the configuration server; and
   automatically configuring, by the SIM card, the DSL modem in response to receiving the configuration data from the configuration server.

2. The method of claim 1, wherein the configuration request is initiated by the SIM card for configuring the DSL modem by determining at least one of:
   a configuration status associated with the DSL modem; or
   a new service connection request associated with the DSL modem.

3. The method of claim 1 further comprising generating, by the SIM card, an authentication request over the mobile communication network for authenticating a user of the DSL modem for a DSL network session immediately after a power up of the DSL modem.

4. The method of claim 3 further comprising:
   enabling, by the SIM card, the DSL modem to handshake with a Broadband Remote Access Server (BRAS), wherein the BRAS is communicatively connected to the configuration server; and
   establishing, by the SIM card, the DSL network session between the DSL modem and the BRAS for carrying out data traffic over a wireline communication network in response to a successful authentication of the user of the DSL modem.

5. The method of claim 4 further comprising storing profile information associated with users of wireline broadband network in a mobile backhaul, wherein the mobile backhaul is operatively coupled with the configuration server and the BRAS.

6. The method of claim 1, wherein the configuration data comprises IP address information, DNS information, remote diagnosis information, authentication information, firmware management information, and device management information associated with the DSL modem.

7. The method of claim 1, wherein the mobile communication network comprises at least one of Wi-Fi, WiMax, Cellular, Radio, Long-Term-Evolution (LTE), CDMA, and GSM.

8. The method of claim 1 further comprising replacing a first provider of DSL subscription service with a second provider of DSL subscription service by changing the SIM card.

9. A system for auto-configuration of a Digital Subscriber Line (DSL) modem in a wireline broadband network, the system comprising:
   a Subscriber Identification Module (SIM) card, operatively coupled with the DSL modem and located within the DSL modem;
   a configuration server, communicatively connected with the SIM card; and
   a Broadband Remote Access Server (BRAS), communicatively connected with the configuration server and the SIM card, wherein the SIM card is configured to:
      initiate a configuration request for configuring the DSL modem, the configuration request being based on a location data associated with the SIM card;
      transfer the configuration request to the configuration server over a mobile communication network;
      receive a configuration data corresponding to the configuration request from the configuration server, wherein the configuration data is determined based on at least one parameter associated with the configuration request; and
      automatically configure the DSL modem in response to receiving the configuration data from the configuration server.

10. The system of claim 9, wherein the SIM card is further configured to initiate the configuration request for configuring the DSL modem by determining at least one of:
    a configuration status associated with the DSL modem; or
    a new service connection request associated with the DSL modem.

11. The system of claim 9, wherein the SIM card is further configured to generate an authentication request over the mobile communication network for authenticating a user of the DSL modem for a DSL network session immediately after a power up of the DSL modem.

12. The system of claim 9, wherein the SIM card is further configured to:

enable the DSL modem to handshake with a Broadband Remote Access Server (BRAS), wherein the BRAS is communicatively connected to the configuration server; and establish the DSL network session between the DSL modem and the BRAS for carrying out data traffic over a wireline communication network in response to a successful authentication of the user of the DSL modem.

13. The system of claim 9, wherein profile information associated with users of wireline broadband network are stored in a mobile backhaul, wherein the mobile backhaul is operatively coupled with the configuration server and the BRAS.

14. The system of claim 9, wherein the configuration data comprises IP address information, DNS information, remote diagnosis information, authentication information, firmware management information, and device management information associated with the DSL modem.

15. The system of claim 9, wherein the mobile communication network comprises at least one of Wi-Fi, WiMax, Cellular, Radio, Long-Term-Evolution (LTE), CDMA, and GSM.

16. The system of claim 9, wherein the SIM card is changed to replace a first provider of DSL subscription service with a second provider of DSL subscription service.

17. A non-transitory computer readable medium having instructions stored thereon for execution by a processor in wireline broadband network to perform a method for:

initiating a configuration request at a SIM card for configuring a Digital Subscriber Line (DSL) modem, the configuration request being based on a location data associated with the SIM card;

transferring the configuration request to a configuration server over a mobile communication network;

sending a configuration data corresponding to the configuration request to the SIM card over the mobile communication network, wherein the configuration data is determined based on at least one parameter associated with the configuration request;

receiving the configuration data sent by the configuration server; and automatically configuring the DSL modem in response to receiving the configuration data from the configuration server.

* * * * *